April 28, 1953
R. E. SHELBY
2,636,671
RADIO AUDIENCE COUNTING SYSTEM
Filed Oct. 21, 1949
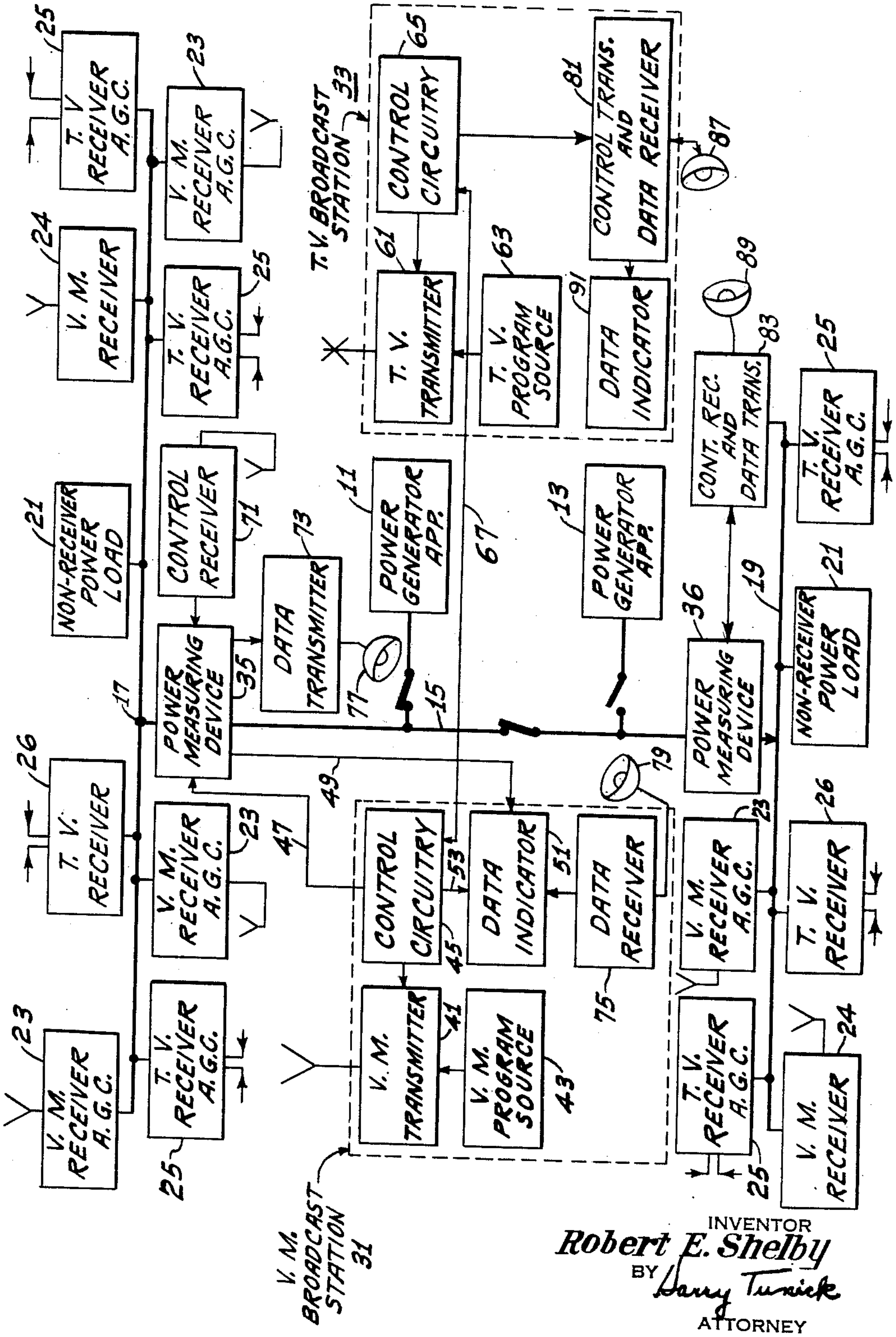
INVENTOR
Robert E. Shelby
BY Harry Tunick
ATTORNEY Patented Apr. 28, 1953 2,636,671

UNITED STATES PATENT OFFICE 2,636,671

RADIO AUDIENCE COUNTING SYSTEM

Robert Evart Shelby, Teaneck, N. J., assignor to Radio Corporation of America, a corporation of Delaware Application October 21, 1949, Serial No. 122,637

3 Claims. (Cl. 235—52)

The invention pertains to radio and television broadcasting and particularly to means and apparatus for determining the number of receiving sets tuned to a given broadcasting station in a given area at a given time.

Successful operation of a radio or television broadcasting station from a commercial standpoint requires that the operators have some knowledge as to the number of receiving sets which are receiving the intelligence broadcast by that station. In the past, this information has been gathered practically entirely by human operators telephoning possible listeners selected at random from a local telephone directory and interrogating the same. This method, while extremely simple, is economically expensive and, moreover, possesses many practical disadvantages, among which are the fact that telephone directory listing has no correlation to the radio set owners in a given area, that only relatively light sampling can be effected for any one broadcasting day, and that it is necessary to disturb members of the listening audience, which is considered highly undesirable. Furthermore, with this method it is next to impossible to determine whether the listener under consideration is listening to an entire program or only to a portion thereof.

Accordingly, it is an object of the invention to provide means and apparatus for automatically determining the approximate number of radio or television sets tuned to a given broadcasting station in a given area at a given time.

It is another object of the invention to provide means and apparatus for determining the extent of the listening audience of a local broadcasting station without disturbing that audience.

A further object of the invention is to provide means and apparatus for computing the approximate number of radio receivers tuned to a given broadcasting station which does not require additional apparatus at the receiver.

Still another object of the invention is to provide means and apparatus to simultaneously determine whether or not a large number of receiving sets in a given area are tuned to the broadcasting station under consideration.

It is a still further object of the invention to provide means and apparatus for determining the extent of the listening audience of a radio station without interrupting the program transmitted or disturbing the audience in any way.

It is an additional object of the invention to provide means to determine the total number of receiving sets tuned to a given broadcasting station at short time intervals.

It is yet another object of the invention to provide means for determining the number of radio receivers tuned to two different broadcast stations without interference between the individual computing apparatuses.

These and other objects of the invention which will appear as the specification progresses are attained according to the invention by utilizing the underlying principle that a large percentage of all broadcast receivers have some form of automatic gain control. When such a receiver is tuned to a strong carrier, the A. G. C. operates to lower the anode current in certain tubes in the receiver and thereby reduces slightly the power drawn from the primary power supply by the receiver. Now, it is recognized, of course, that this feature is not found in all radio receivers in a given service area since some would not be equipped with A. G. C., some would be battery-operated, etc. But nevertheless, a very worthwhile sample of total audience may be tapped by the proposed method. According to the invention, the carrier of the broadcast station is turned off entirely or the strength of the carrier is commensurably reduced for a short interval of time and the variation in total power supplied by the central power station is simultaneously measured. Should the broadcast transmitter derive its primary power from the same source as the receivers, it is of course necessary to apply a correction to the measurement to compensate for the power decrease occasioned by the interruption of the carrier wave. The length of the interval during which the carrier is turned off or changed in amplitude is necessarily determined by the time constant of the power supply network serving the area in question. It is contemplated that only a fraction of a second would be necessary, but it is recognized that in some instances it might have to be one or more seconds. This test operation is naturally carried out during a suitable lull in the program being transmitted, though if the time interval required for the test is sufficiently short, it will be unnoticed by most listeners. Measurement of the power increment or decrement at the central power station must be synchronized with the change in the broadcast carrier strength and this is done by suitable wire line connection or by radio monitoring of the carrier at the power station.

The invention will be described in detail with reference to the accompanying drawing forming a part of the specification and in which the sole figure illustrates apparatus for determining the approximate number of radio receivers tuned to given broadcasting stations according to the invention.

By means of the arrangement shown in the sole figure of the drawing, it can be determined whether or not a large percentage of the radio or television receivers in a given area are tuned to a given transmitter at a given time. The area within which the computing is conveniently effected is that of the local electric power distribution system shown here as a power generating apparatus 11, auxiliary power generating apparatus 13, connected to a primary power distribution bus 15, in turn connected to secondary distribution busses 17 and 19 for the distribution of electric power throughout the service area supplied by the local power company. The usual power load, illustrated by blocks 21, and a number of radio and television receiving sets 23—26 will be operatively connected to secondary busses 17 and 19. These will be found to be of four classes: voice modulated receivers with automatic gain control, 23; voice modulated receivers without automatic gain control, the latter of which receivers are gradually being replaced by the former, 24; television receivers with automatic gain control, 25; and television receivers without automatic gain control, 26. The voice modulation receivers may be either amplitude modulation or frequency modulation receivers, of which approximately 90 per cent or greater will incorporate automatic gain control and it is considered that 95 per cent or more of the television receivers will incorporate automatic gain control features. Within the above mentioned electric power service area there will be located a voice modulated broadcast station 31 and perhaps a television broadcast station 33, to which one or more receivers 23—26 may be tuned and the determination of at least the approximate numbers of which for each type of broadcast is desired.

According to the invention, sensitive power measuring devices 35, 36 are interposed in the electric distribution system between the power generating apparatus 11 and the loads, represented by non-receiver power loads 21 and the loads imposed by receivers 23—26, and arranged to measure the power consumed by the loads on secondary distribution busses 17 and 19. These power measuring devices are contemplated to be operated in conjunction with existing power measuring circuitry employed by the local power company and must meet certain special requirements detailed below. In the simplest arrangement according to the invention, the carrier wave produced by transmitter 41 which is modulated either in amplitude or frequency with a program obtained from a program source 43 preferably is substantially suppressed, or entirely interrupted, for a short time interval in response to operation of control circuitry 45 which also upon initiating operation to control the carrier strength actuates power measuring device 35 over wire line connection 47 to determine a power reference level whereupon the changes in carrier strength will affect those receivers tuned to transmitter 41 and incorporating A. G. C. features to increase power consumption, which increase will be reflected by power measuring device 35 and transmitted via wire line 49 to a data indicator 51. Data indicator 51 may be of any known telemetering indicator device, numerous examples of which may be had by reference to the book "Principles and Methods of Telemetering" by Borden and Thynell, Reinhold Publishing Company, 1948.

Control circuitry 45 may comprise known electronic circuits, preferably pushbutton actuated, comprising a relaying circuit to actuate power measuring device 35 to obtain a reference indication of the power consumption immediately prior to change in carrier intensity, a relaying circuit to effect the change in carrier intenstiy, and timing circuits to control the relaying circuitry in proper sequence. As an example of such control circuitry in the simplest form, a push-button switch may be used to operate a relay at transmitter 41 the contacts of which are arranged to vary the intensity of the carrier wave in known manner, such as varying the bias on a buffer amplifier for example, and at the same time operate a relay at power measuring device 35 the contacts of which are arranged to connect operating power to the recording apparatus. The relay at transmitter 41 should be somewhat slow to act in order that the power level be measured just prior to change in carrier wave intensity and the relay at device 35 should be slow to release so that the power levels prior to and after carrier intensity change both are indicated. As alternate embodiments, electronic relay circuitry such as multivibrators or transient responsive circuitry such as differentiating and integrating circuits may be employed according to established practice. Variations of such circuits will be obvious to those skilled in the art.

Power measuring devices 35, 36 must be capable of measuring the power increment to a rather close degree. Many known circuits can be adopted for this purpose by those skilled in the art, for example, a balanced bridge arrangement may be used, in which case the bridge is preferably balanced by motor driven means in response to control circuitry 45 just prior to the change in carrier intensity. An oscilloscope may be employed to indicate power increment, but preferably some known form of data transmission circuitry, such as a frequency shift telemetering system commonly used by power and utility companies, would be employed.

Any known form of data indicator 51 may be used, the counter type being considered most convenient. If the latter is used, it may be reset to zero prior to the indication operation by control circuitry 45 as indicated schematically by connection 53. In its simplest form, an ordinary resetting counter mechanism is arranged to have the count bar actuated by the data transmission circuitry. For example, with a telemetering system transmitting intelligence in the form of a number of cycles of a constant frequency wave or a number of pulses proportional to the amount of change in power consumed, a multivibrator circuit may be triggered and a solenoid in the output circuit thereof may be arranged to actuate the count bar of the mechanism. Similarly, contacts of the push button or one of the relays actuated thereby may be arranged to energize another solenoid, or a stepping type relay, the armature of which is coupled to the reset bar of the counter mechanism to set the counter to zero at the beginning.

Since the various receivers in the area being surveyed will be at different distances from the broadcast transmitter and will receive signals of varying strength for that and other reasons and also because various makes and types of receivers will have different characteristics in this regard, and the fact that there will be some receivers not provided with A. G. C. and some battery operated receivers in use should be considered, it is not considered feasible to calculate the exact number of receivers directly from the change in power load at the power station. It is believed preferable to obtain data as outlined above and correlate the results with studies made simultaneously by other accepted methods of audience measurement. Even without such correlation, however, this method provides an excellent means of comparing audience size for different programs. In an area such as metropolitan New York, which is served by several different power supply sources, it would be feasible to make the measurements simultaneously in two or more power stations. Furthermore, it is contemplated that under some circumstances it may be desirable to practice the invention in rather small divisions of a power network, such as a housing development or even a single apartment dwelling. More reliable results may be obtained by having several such measurements at suitable intervals and taking an average of the change in total power, in order to average out effects due to changes in total power caused by equipment other than radio receivers.

It is also contemplated according to the invention to determine the approximate number of television receivers tuned to a given television broadcast station by modifying the arrangement hereinbefore described to the extent that control circuitry 65, which may be of substantially the same construction as control circuitry 45, will cause a television transmitter 61 to transmit a black level signal for the prescribed measuring interval immediately following or preceding a white level signal, as a result of which power measuring devices 35 and 36 will provide an indication of the power increment due to the change in power drawn by the picture tube of television receiver 25. As employed herein, the term black level signal refers to that extreme value of signal which would be transmitted under normal conditions if the picture consisted of a black background only and the term white level signal refers to that signal which would be transmitted if the picture consisted of a white background only. It is considered within the scope of those skilled in the art to arrange control circuitry 65 either to actuate transmitter 61 to transmit a black level signal after a white level signal has been transmitted in response to a television program source 63 or to interpose a white level signal followed by a black level signal, or vice versa, whichever is desired.

It is obvious from the foregoing description that no interference will arise between determinations made by two or more V. M. or T. V. broadcasting stations operating in the same service area provided the determinations are not made at the same time. In order to assure that the latter condition will not be disregarded, it is considered preferable that some measure be taken to prevent overlapping use of the common facilities. In the simplest arrangement conceivable, where television and voice modulation transmitters are located in the same building, as may become common practice, a simple wire line interlock circuit, indicated by connection 67 is provided, for example, a simple back and front contact interconnection having in circuit therewith a slow-acting relay or other time delay circuit rendering the engagement of control circuitry 65 initiating means inoperative for a predetermined period after the actuation of the means initiating operation of control circuitry 45. In other installations the wire line may be replaced by more complex but readily available means mentioned in greater detail below.

While connections 47, 49, and 67 have been described as wire line connections in order to illustrate a basic arrangement of the invention, it is within the scope of the invention to utilize carrier current communications systems currently employed by utility companies with equally efficient results. Under some circumstances the use of such expedients will not be available and resort may then be made to other telemetering schemes, examples of some of which that are obviously applicable to the basic invention will be found in the book, "Principles and Methods of Telemetering" by P. A. Borden and G. M. Thynell, published by Reinhold Publishing Corp., 1948. In such a case, it is contemplated that the operation be carried out by modifying a conventional receiver in accordance with known circuitry to provide a control receiver 71 located near power measuring device 35 and tuned to transmitter 41 to actuate the former in response to carrier intensity changes. Power measuring device 35, under control receiver 71 and control circuitry 45 would provide an output indicative of the desired intelligence which is then used to modulate a data transmitter 73 to relay the data to a data receiver 75 by means of a radiant energy beam path established by U. H. F. antennas 77 and 79.

Alternatively a completely separate communication system is provided as shown by control transmitter and data receiver 81 operable under control of control circuitry 65 to transmit conditioning signals to a control receiver and data transmitter 83 over a radio relaying path established by antennas 87 and 89. Receiver-transmitter 83 is operatively coupled to power measuring device 36 as in the previously mentioned arrangement for control of device 36 and transmission of the resultant data back to data indicator 91 which may be of substantially the same construction as data indicator 51 although it is not necessarily so limited. An advantage of this more complex arrangement is of course found in its use as an auxiliary communication channel between the power measuring point and the broadcasting station.

While the invention has been described in terms of rather specific embodiments, it should be understood that other arrangements will be suggested to one skilled in the art without departing from the spirit and scope of the invention.

I claim:

1. An arrangement for obtaining an indication of the number of radio receivers tuned to a transmitter broadcasting a carrier wave, comprising a common electric power distribution system, a plurality of radio wave receivers drawing operating power from said common electric power distribution system, said receivers having automatic control of gain and thereby responding in the normal mode of reception of an intelligence carrying continuous carrier wave to a change in characteristics of the received carrier wave with a change in power drawn from said common electric power distribution system, a power measuring device coupled to said common electric distribution system to measure the power flowing therein, and means substantially and abnormally to alter the amplitude of said given intelligence carrying continuous carrier wave to cause the amount of power drawn by said radio wave receivers from said common electric distribution circuit to vary, the variation in said power drawn at the time of said alteration being a measure of the number of radio wave receivers receiving said given carrier wave.

2. An arrangement for obtaining an indication of the number of radio receivers tuned to a transmitter broadcasting a carrier wave of given characteristics, comprising a common electric power distribution system, a plurality of radio wave receivers drawing operating power from said common electric power distribution system, said receivers incorporating automatic gain control circuits responding in the normal mode of reception of an intelligence carrying continuous carrier wave to a change in signal strength of the received carrier wave with a change in power drawn from said common electric power distribution system, a power measuring device coupled to said common electric distribution system to measure the power flowing therein, and means to suppress said given intelligence carrying continuous carrier wave to cause the amount of power drawn by said radio wave receivers from said common electric distribution circuit to increase, the increase in power drawn during the time of alteration being a measure of the number of radio wave receivers receiving said given carrier wave.

3. An arrangement for obtaining an indication of the number of television receivers tuned to a transmitter broadcasting a carrier wave modulated by picture signals, comprising a common electric power distribution system, a plurality of television program receivers drawing operating power from said common electric power distribution system, said receivers being of the type responding in the normal mode of reception of a visual program modulated continuous carrier wave to a change in level of the picture signal modulation of the received modulated continuous carrier wave with a change in power drawn from said common electric power distribution system, a power measuring device coupled to said common electric distribution system to measure the power flowing therein, and means to vary the picture signal level of said visual carrier wave to one of the limits of said modulation to cause the amount of power drawn by said television receivers from said common electric distribution circuit to vary to the extreme amount possible, the variation in said power drawn at the time of said variation being a measure of the number of television receivers receiving said visual carrier wave.

ROBERT EVART SHELBY.

References Cited in the file of this patent

UNITED STATES PATENTS

| Number | Name | Date |
|---|---|---|
| 1,990,489 | Hopkins | Feb. 12, 1935 |
| 2,092,120 | Hopkins | Sept. 7, 1937 |
| 2,096,109 | Hopkins | Oct. 19, 1937 |
| 2,188,165 | Thomas | Jan. 23, 1940 |
| 2,206,702 | La Pierre | July 2, 1940 |
| 2,344,562 | Potter | Mar. 21, 1944 |
| 2,465,976 | Goldsmith | Mar. 29, 1949 |

OTHER REFERENCES

Tele-Tech; pages 38, 39, 64, 65; May 1949.